April 7, 1931.  B. C. VON PLATEN ET AL  1,799,201

REFRIGERATOR

Filed Nov. 21, 1925

INVENTORS
Baltzar Carl von Platen
Carl Georg Munters
BY
Wm. J. Hedlund
ATTORNEY

Patented Apr. 7, 1931                                                1,799,201

UNITED STATES PATENT OFFICE

BALTZAR CARL von PLATEN AND CARL GEORG MUNTERS, OF STOCKHOLM, SWEDEN, ASSIGNORS, BY MESNE ASSIGNMENTS, TO ELECTROLUX SERV-EL CORPORATION, A CORPORATION OF DELAWARE

REFRIGERATOR

Application filed November 21, 1925. Serial No. 70,649.

The present invention relates to refrigerators of the absorption type in which a cooling agent evaporates in the presence of an auxiliary agent, the purpose of the auxiliary agent being to obtain a uniform total pressure throughout the refrigerator.

The present invention consists in part in providing a novel means for hermetically sealing refrigerators after they have been filled with the substance necessary for obtaining refrigeration, and in part includes novel means for filling refrigerators.

Figure 1:
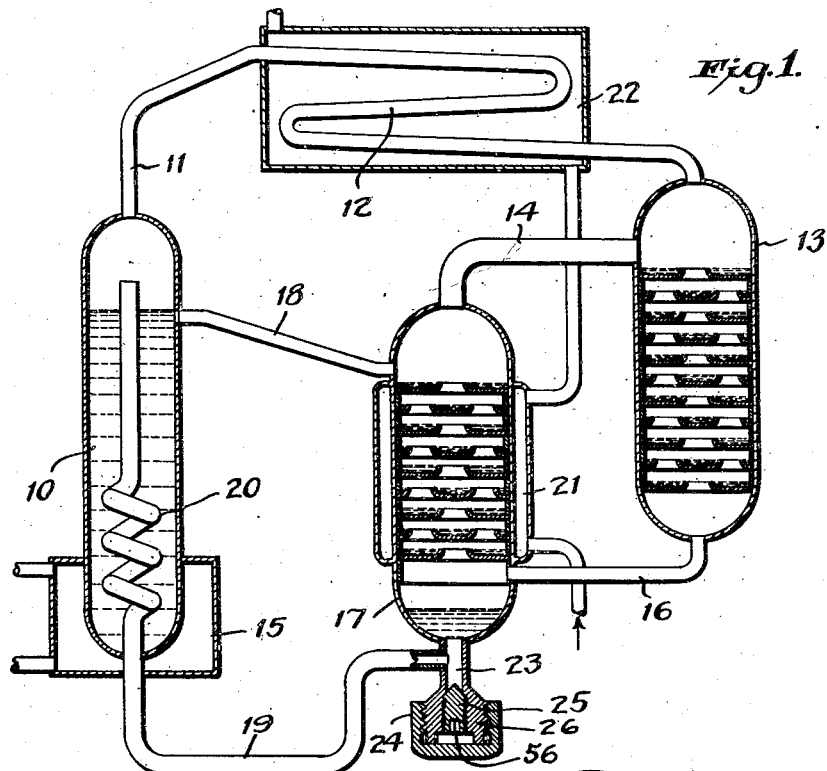
Figure 2:
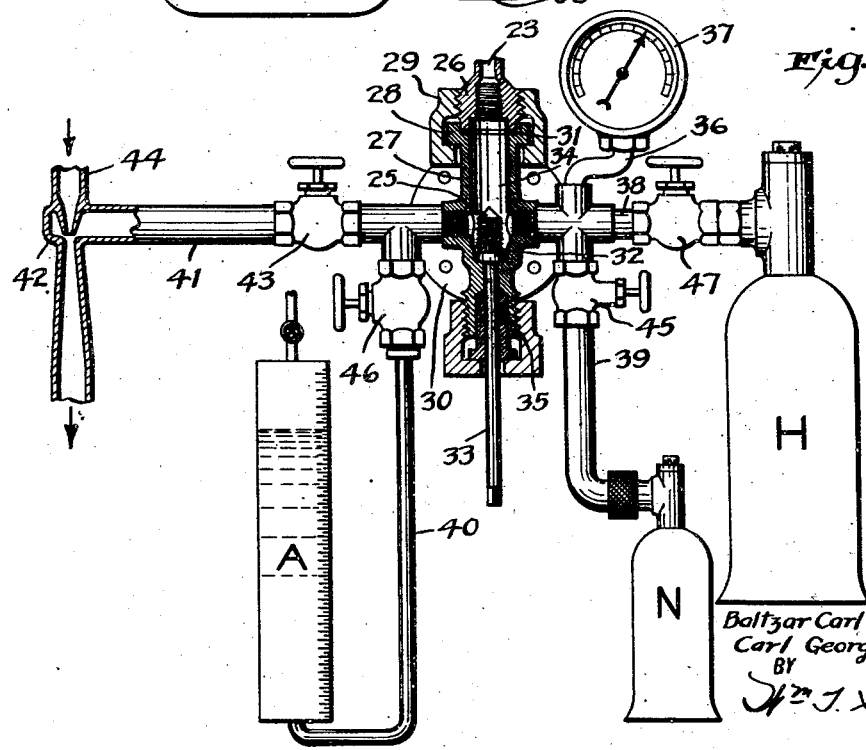

The objects and advantages of the invention will be best understood by the following description taken in connection with the appended drawing, in which:

Fig. 1 shows a refrigerator of one form to which the invention is applicable; and Fig. 2 shows a filling apparatus.

Referring more particularly to Fig. 1, which shows one type of refrigerator to which the present invention may be applied, it being understood, however, that the invention is not limited to this type of refrigerator, 10 designates the generator which contains a cooling agent in solution, for example, ammonia dissolved in water. Generator 10 is heated in any desired way as by steam jacket 15 and vapor formed in the generator passes through conduit 11 into condenser coil 12 in which the vapor is converted into liquid and the liquid passes into the upper part of evaporator 13. Evaporator 13 is also supplied with an auxiliary agent such as hydrogen through conduit 14. Liquid ammonia entering the evaporator diffuses into the hydrogen and in so diffusing evaporates, as a result of which heat is abstracted from the surroundings of the evaporator whereby refrigeration is obtained. Ammonia gas and hydrogen are thus mixed in the evaporator and the mixture of these substances passes through conduit 16 into the lower part of absorber 17. Weak absorption liquid passes from the generator through conduit 18 into the upper part of the absorber in which it absorbs ammonia, freeing the hydrogen which returns through pipe 14 to the evaporator. Absorption liquid, strong in ammonia, collects at the bottom of the absorber 17 and passes therefrom through conduit 19 into the generator. Circulation between the generator and absorber is effected by the formation of vapor in conduit 19 which on passing through the liquid space of the generator is made in the form of a coil 20. 21 and 22 designate interconnected cooling jackets for the absorber 17 and for the condenser 12, respectively.

In apparatus of this type the degree of evaporation is dependent in part upon the characteristics of the auxiliary agent and it is highly desirable to have an auxiliary agent of very low molecular weight. It is characteristic of gases of low molecular weight to leak out from a container under pressure through the smallest leakage opening, caused, for example, by improperly packed stuffing boxes and pipe joints which are not fitted to be absolutely tight. Apparatus of the type described are usually under quite considerable pressure, for example, 175 lbs. per sq. in. As a consequence, the greatest care must be taken to prevent leakage, particularly of the auxiliary agent.

It is also obvious that it is necessary to fill apparatus of the type described through some opening which must later be closed up and this filling opening has been found to give rise to leakage of substances in the refrigerator, particularly the auxiliary agent, unless most carefully made and arranged.

In Fig. 1, the filling opening is designated by reference character 23 which constitutes a part of the conduit leading absorption liquid to the generator and 25 designates a sealing plug for closing this opening. 24 designates an outer cap for the filling fixture.

In previous designs of refrigerators of this type, the filling opening has been placed in one of the upper parts of the apparatus, particularly in the conduit leading from the condenser to the evaporator. When the apparatus is out of operation this conduit contains a gaseous substance and in order to prevent leakage through the opening and the cap therefor, it was found necessary in many cases to employ extraordinary means for sealing such as soldering. This involved expensive work which is over-come by the present invention.

According to the present invention the filling opening is placed at the bottom part of the absorber where it is continually under liquid whether the refrigerator is in operation or not. By this means leakage is prevented for a number of reasons; in the first place, the water acts to rust up any leakage openings and thus affords tightness and in the second place, the liquid at the bottom of the absorber is concentrated ammonia solution which is substantially freed from hydrogen and therefore the very substance which is most liable to leakage is excluded from that part of the apparatus where the filling opening is placed.

The filling apparatus for filling the refrigerator with the various substances serving to cause refrigeration is shown in detail in Fig. 2 and comprises a housing 27 having a flange 28 at the upper end thereof and a screw threaded member 29 surrounding the same which form a pipe joint adapted to be tightly connected to screw threaded member 26 of the refrigerator proper upon removal of outer cap 24. Housing 27 is arranged on flange 30 which can be bolted to some stationary member such as a table. The refrigerator illustrated in Fig. 1 is a relatively small unit and is placed upon the filling apparatus, a washer 31 being placed between housing 27 and member 26 and then member 29 is screwed on to the outer threads of member 26. Before placing the refrigerator upon the filling apparatus the sealing plug 25 is placed within housing 27 upon a boss 32 on the upper end of a plunger rod 33 which is adapted to move longitudinally in the inner passage 34 of housing 27 and which for sake of tightness passes through a stuffing box 35. Sealing plug 25 is formed with a recess 56 to mesh with boss 32. Connected to housing 27 and to the inner passage 34 thereof are various pipes of which pipe 36 connects with a combined pressure and vacuum gage 37; pipe 38 connects with a hydrogen container H; pipe 39 connects with a nitrogen container N; pipe 40 connects with a tank A containing a solution of ammonia in water and pipe 41 connects with an ejector 42. All these pipes are controlled by suitable hand valves. It is to be understood, of course, that the arrangement of pipes is purely optional and that the number of connected vessels will be different depending on the substances used in the refrigerator. The reason in the particular case for connecting with a hydrogen container, a nitrogen container, and an ammonia solution container, is that ammonia, water and hydrogen are the substances used for refrigeration in the apparatus described in Fig. 1, and for the sake of consistency the filling apparatus is described as for the apparatus of Fig. 1 with the substances chosen therefor and nitrogen is used as a preferred cleaning agent.

The filling operation is as follows:

Assume that the refrigerator has been connected to the filling apparatus as above described. The valves controlling conduits 38, 39 and 40 are at first closed and valve 43 controlling conduit 41 is opened. Water is supplied to ejector 42 through conduit 44 and this causes an ejection of air from the refrigerator. The extent of vacuum formed in the refrigerator by this process is indicated on the combined pressure and vacuum gage 37. When the desired vacuum has been obtained in the apparatus, valve 43 is closed and valve 45 in conduit 39 is opened whereby due to the vacuum in the refrigerator nitrogen is drawn into the same. The reason for this is that the ejector will not completely withdraw all the air from the refrigerator and there will be a small amount of oxygen remaining which might be detrimental to the refrigerator in operation. In order to remove this oxygen completely or practically completely, nitrogen is admitted with which the remaining oxygen mixes. When the desired amount of nitrogen has been admitted valve 45 is then closed and valve 43 opened again, water is supplied to ejector 42 and the nitrogen with the remaining oxygen is ejected from the refrigerator. The desired vacuum being obtained valve 43 is closed and then valve 46 controlling pipe 40 is opened and a quantity of ammonia solution to the extent desired is admitted to the refrigerator. It is necessary that an accurate determination of the amount of ammonia solution introduced into the refrigerator be made and for this purpose the vessel containing the ammonia solution may be graduated as indicated. In this connection account should be taken of the fact that there is a certain volume in chamber 34 and the associated spaces in the filling apparatus between the refrigerator and the valves controlling the pipes, and when the apparatus is arranged as shown in Fig. 2 the amount removed from tank A should be greater than the amount required in the refrigerator by the amount of such spaces as are outside the refrigerator and will be filled with liquid when the refrigerator is closed up. This factor having once been determined remains as a constant and allows an easy calculation. If desired, the apparatus instead of being arranged as shown in Fig. 2 may be inverted so that when ammonia is allowed to pass into chamber 34, it will flow downwardly into the refrigerator and thus all the ammonia admitted into chamber 34 will pass into the refrigerator and stay there. Obviously, the particular way of setting up the apparatus is optional and the invention is independent thereof. When the required amount of ammonia has been admitted to the refrigerator, valve 46 is closed and then valve 47 controlling pipe 38 is opened whereupon hydrogen passes into refrigerator from tank H. After the pressure has risen to the desired amount as indicated by gage 37, valve 47 is closed. The refrigerator is now filled with the substances necessary for its operation and plunger rod 33 is then moved upwardly so that sealing plug 25 can be introduced into the filling opening and screwed into place. The outer end of plunger rod 33 may be arranged in any desired manner to form means for longitudinally moving and rotating the plunger rod. Sealing plug 25 having been screwed in tightly the refrigerator is removed from the filling apparatus by unscrewing member 29 and after screwing on cap 24 the refrigerator is ready for use, and another refrigerator can be attached to the filling apparatus for filling.

Obviously instead of ammonia water and hydrogen, other groups of refrigerating mediums may be used.

It will be further obvious to those skilled in the art, that various changes in form or parts and arrangement of parts are within the scope of the present invention and the invention is therefore not to be limited to the embodiment shown.

What we claim is:

1. Filling apparatus for a refrigerator comprising a housing containing a chamber adapted to have communication with a refrigerator, means to create a vacuum in said chamber, means to indicate the pressure in said chamber, means to supply said chamber with a solution of cooling agent and with an auxiliary agent, a sealing member inserting means within said chamber and means to move said inserting means longitudinally and rotationally from outside the housing while the housing is under pressure.

2. Filling apparatus for a refrigerator comprising a housing containing a chamber adapted to have communication with a refrigerator, means to create a vacuum in said chamber, means to indicate the pressure in said chamber, means to supply said chamber with a solution of cooling agent and with an auxiliary agent, a member within said chamber adapted to engage a refrigerator sealing plug, a plunger rod attached to said member, said plunger rod extending through said housing and means to move said plunger rod longitudinally and to rotate said plunger rod from outside said housing while said housing is under pressure.

3. Filling apparatus for a refrigerator comprising a housing containing a chamber adapted to have communication with a refrigerator and having a threaded extension for attachment to a refrigerator, means to create a vacuum in said chamber, means to indicate the pressure in said chamber, means to supply said chamber with a solution of cooling agent and with an auxiliary agent, a member within said chamber adapted to engage a refrigerator sealing plug, a plunger rod attached to said member, a stuffing box in said housing, said plunger rod extending through said stuffing box and means to move said plunger rod longitudinally and to rotate said plunger rod.

4. Method of filling a refrigerating apparatus which comprises removing air from the apparatus to obtain a vacuum, drawing into the apparatus a quantity of nitrogen under the influence of the vacuum produced, removing the nitrogen with matter taken up by the same to again obtain a vacuum, drawing into the apparatus a predetermined quantity of solution of ammonia in water under the influence of the second vacuum created, forcing hydrogen gas into the apparatus to a substantially high pressure and hermetically sealing the apparatus.

In testimony whereof we have affixed our signatures.

BALTZAR CARL von PLATEN.
CARL GEORG MUNTERS.